(12) United States Patent  
Turnbull et al.

(10) Patent No.: US 10,794,929 B2  
(45) Date of Patent: Oct. 6, 2020

(54) SYSTEM FOR VIBRATION SENSING

(71) Applicant: STANLEY CONVERGENT SECURITY SOLUTIONS, INC., Naperville, IL (US)

(72) Inventors: Robert C. Turnbull, Ottawa (CA); Terance D. Brown, White Lake (CA); Damon Kutten, Ottawa (CA)

(73) Assignee: Stanley Convergent Security Solutions, Inc., Naperville, IL (US)

( * ) Notice: Subject to any disclaimer, the term of this patent is extended or adjusted under 35 U.S.C. 154(b) by 123 days.

(21) Appl. No.: 16/067,333

(22) PCT Filed: Jun. 30, 2016

(86) PCT No.: PCT/US2016/040305  
§ 371 (c)(1),  
(2) Date: Jun. 29, 2018

(87) PCT Pub. No.: WO2017/160334  
PCT Pub. Date: Sep. 21, 2017

(65) Prior Publication Data  
US 2019/0018038 A1     Jan. 17, 2019

Related U.S. Application Data

(60) Provisional application No. 62/310,260, filed on Mar. 18, 2016.

(51) Int. Cl.  
*G01H 1/00*     (2006.01)  
*G01P 15/097*     (2006.01)  
(Continued)

(52) U.S. Cl.  
CPC .......... *G01P 15/097* (2013.01); *G01H 17/00* (2013.01); *G01P 1/023* (2013.01);  
(Continued)

(58) Field of Classification Search  
CPC ........ G01P 15/00; G01P 15/097; G01H 17/00  
See application file for complete search history.

(56) References Cited

U.S. PATENT DOCUMENTS 2,590,530 A    3/1952   Groenendyke  
4,601,206 A *   7/1986   Watson ................. G01C 21/16  
                                                              73/510

(Continued)

OTHER PUBLICATIONS

Sparks, D. et al.—"Sensors the Number of Sensors Used in Automobiles Has Risen Dramatically in the Last Decade. Current Researchers Are Looking for New Sensors and New Ways to Package Them"—Automotive Engineering International, SAE International, Warrendale, Pennsylvania, USA—vol. 107 No. 9—Sep. 1, 1999—XP000860903—ISSN: 1543-849X—p. 37, middle column; p. 41, left-hand column.

(Continued)

*Primary Examiner* — Jamel E Williams  
(74) *Attorney, Agent, or Firm* — Adan Ayala

(57) ABSTRACT

A vibration sensor for construction projects has a housing, a low range accelerometer and a high range accelerometer disposed in the housing, and an analog-to-digital conversion circuit connected to the low and high range accelerometers. The low range accelerometer may have a noise floor below 0.0248 g across frequencies up to 1 kHz, especially between 1 Hz and 315 Hz. The high range accelerometer has a maximum acceleration equal to or greater than 50 g across frequencies up to 1 kHz, especially between 1 Hz and 315 Hz.

17 Claims, 5 Drawing Sheets

(51) Int. Cl.
*G01H 17/00* (2006.01)
*G01V 1/18* (2006.01)
*G01P 1/02* (2006.01)
*G01P 15/08* (2006.01)
*G01P 15/00* (2006.01)
*G01V 1/16* (2006.01)
*G01H 1/14* (2006.01)

(52) U.S. Cl.
CPC .......... *G01P 15/0802* (2013.01); *G01V 1/184* (2013.01); *G01H 1/00* (2013.01); *G01H 1/14* (2013.01); *G01P 15/00* (2013.01); *G01V 1/164* (2013.01)

(56) References Cited

U.S. PATENT DOCUMENTS

| | | |
|---|---|---|
| 5,056,783 A | 10/1991 | Matcovich et al. |
| 8,757,003 B1 | 6/2014 | Makaremi |
| 2004/0070926 A1* | 4/2004 | Boykin ................ G11B 25/043 361/679.33 |
| 2005/0125197 A1* | 6/2005 | Duron ................ G01M 5/0033 702/182 |
| 2010/0242603 A1* | 9/2010 | Miller ...................... B81B 7/02 73/514.32 |
| 2011/0196262 A1* | 8/2011 | McLeod ............... A61B 5/0053 600/587 |
| 2012/0072078 A1* | 3/2012 | Oosaki .................... B60R 25/00 701/46 |
| 2015/0219777 A1* | 8/2015 | Smith ...................... G01V 1/28 702/14 |
| 2017/0336228 A1* | 11/2017 | Grossman .............. G01D 11/10 |
| 2019/0360809 A1* | 11/2019 | Kabasawa ............. G01P 15/125 |

OTHER PUBLICATIONS

Springer, Oliver—Extended European Search Report re European Patent Appln. No. 16894778.6-1022/3430441 (PCT/US2016040305) dated Sep. 25, 2019—9 pages—Munich Germany.

Copenheaver, Blaine R.—International Search Report and Written Opinion re corresponding International Patent Application No. PCT/US2016/040305 dated Sep. 19, 2016—ISA/US—Alexandria, VA.

* cited by examiner

SYSTEM FOR VIBRATION SENSING

CROSS-REFERENCE TO RELATED APPLICATION

The present application derives priority from U.S. Patent Application No. 62/310,260, filed on Mar. 18, 2016, titled "SYSTEM FOR VIBRATION SENSING," and is fully incorporated herein by reference.

FIELD OF THE INVENTION

The present invention relates to a vibration sensor, and in particular, to a vibration sensor for construction projects and/or industrial activities.

BACKGROUND

Local, state and/or federal regulations may limit the generation of vibrations in construction projects and/or industrial activities. In particular, the regulations may require the monitoring for continuous and/or transient vibrations in such locales. Accordingly it is desirable to use vibration sensors for such monitoring.

Typically a geophone is used as the vibration sensor. The geophone is buried in the ground. However, the geophone must be precisely disposed in the ground. If the geophone is inclined beyond a certain tolerance, the geophone will not sense vibrations properly and would have to be dug out from the ground, re-disposed and re-buried.

DESCRIPTION

Figure 1:
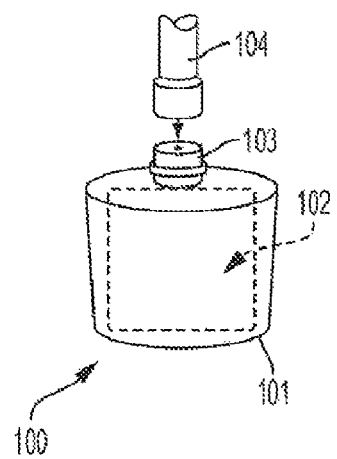
FIG. 1 shows a vibration sensor.
Figure 2:
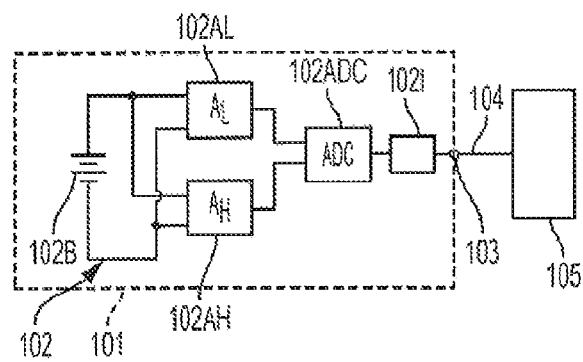
FIG. 2 is a block diagram of the main components of the vibration sensor of FIG. 1.

Referring to FIGS. 1-2, a vibration sensor 100 may include a housing 101, a sensor circuit 102, a terminal 103 on housing 101 for connecting the sensor circuit 102 to a computer or server 105 via a cable 104. Preferably housing 101 is water-proof.

Sensor circuit 102 may include a low range accelerometer 102AL, a high range accelerometer 102AH, an analog-to-digital conversion circuit 102ADC, and an interface circuit 102I. Persons skilled in the art will recognize that low range accelerometer 102AL, high range accelerometer 102AH, analog-to-digital conversion circuit 102ADC and/or interface circuit 102I may be disposed on separate housings within housing 101 or outside of housing 101.

Low range accelerometer 102AL preferably has a noise floor below 0.0248 g (or 0.13 mm/s) across the frequencies up to 1 kHz, and preferably between 1 Hz and 315 Hz. A schematic diagram for a circuit used with low range accelerometer 102AL is shown in FIG. 3.

High range accelerometer 102AH preferably has a noise floor below the maximum detectable acceleration of low range accelerometer 102AL. In addition, high range accelerometer 102AH may have a maximum acceleration equal to or greater than 50 g (or 254 mm/s) across the frequencies up to 1 kHz, and preferably between 1 Hz and 315 Hz. A schematic diagram for a circuit used with high range accelerometer 102AH is shown in FIG. 4.

Figure 5:
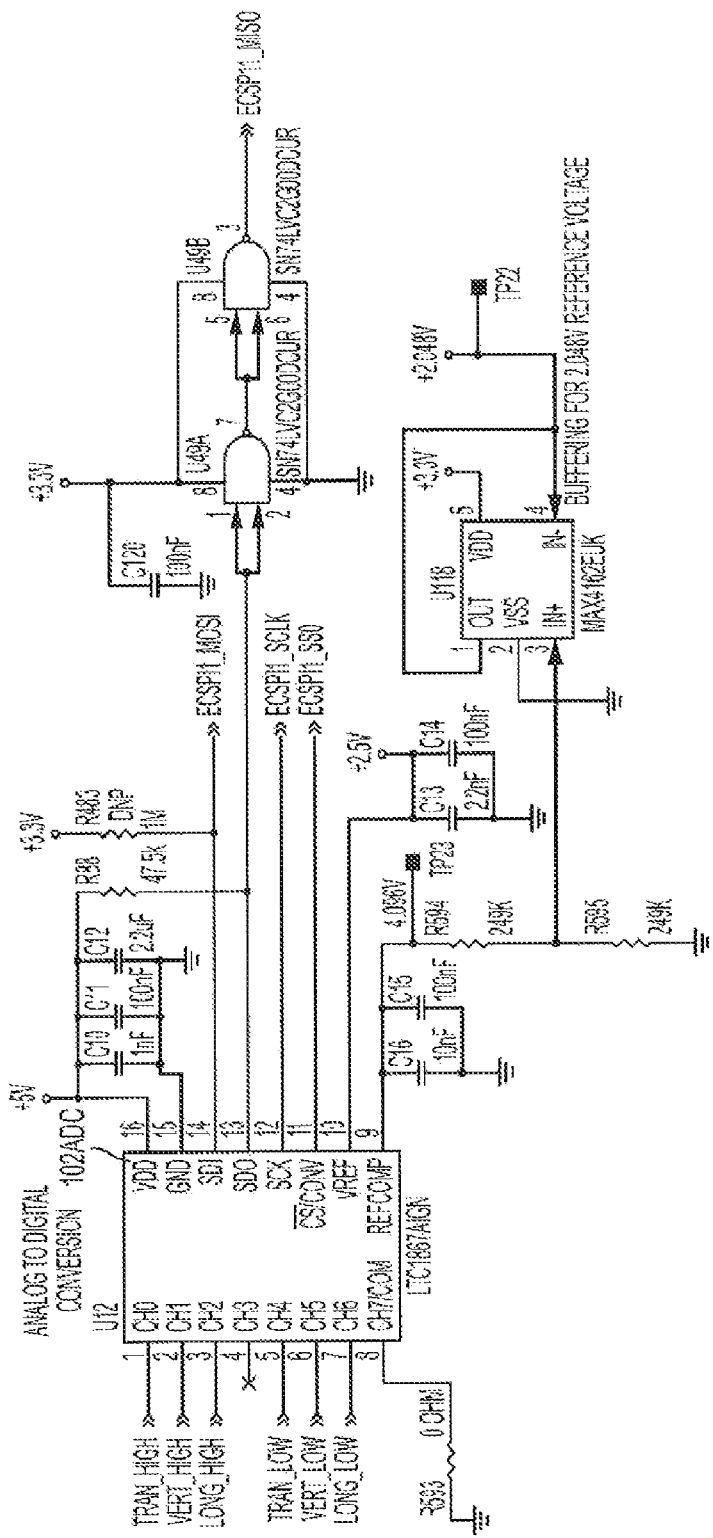
FIG. 5 is a schematic diagram of an analog-to-digital conversion circuit.

The outputs of low and high range accelerometers 102AL, 102AH are inputted into an analog-to-digital conversion circuit 102ADC. A schematic diagram for a circuit used with analog-to-digital conversion circuit 102ADC is shown in FIG. 5. Persons skilled in the art will recognize that using both low and high range accelerometers 102AL, 102AH will provide a better dynamic range than using a single accelerometer due to the wide range of frequencies required to be detected (i.e., up to 1 kHz, and preferably between 1 Hz and 315 Hz) as well as the output resolution necessary to properly report across the wide range of frequencies.

Figure 3:
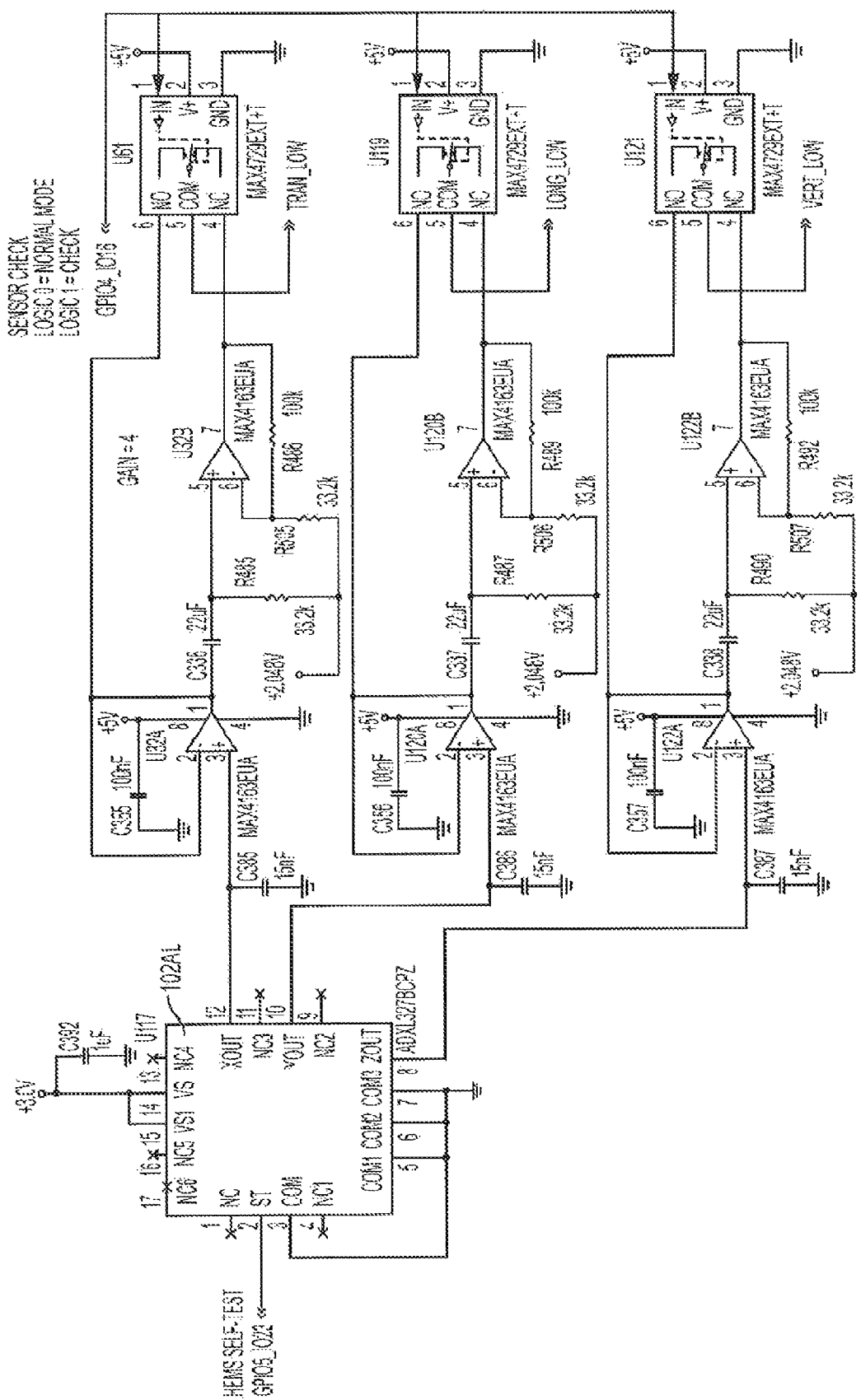
FIG. 3 is a schematic diagram of a low range accelerometer circuit.
Figure 4:
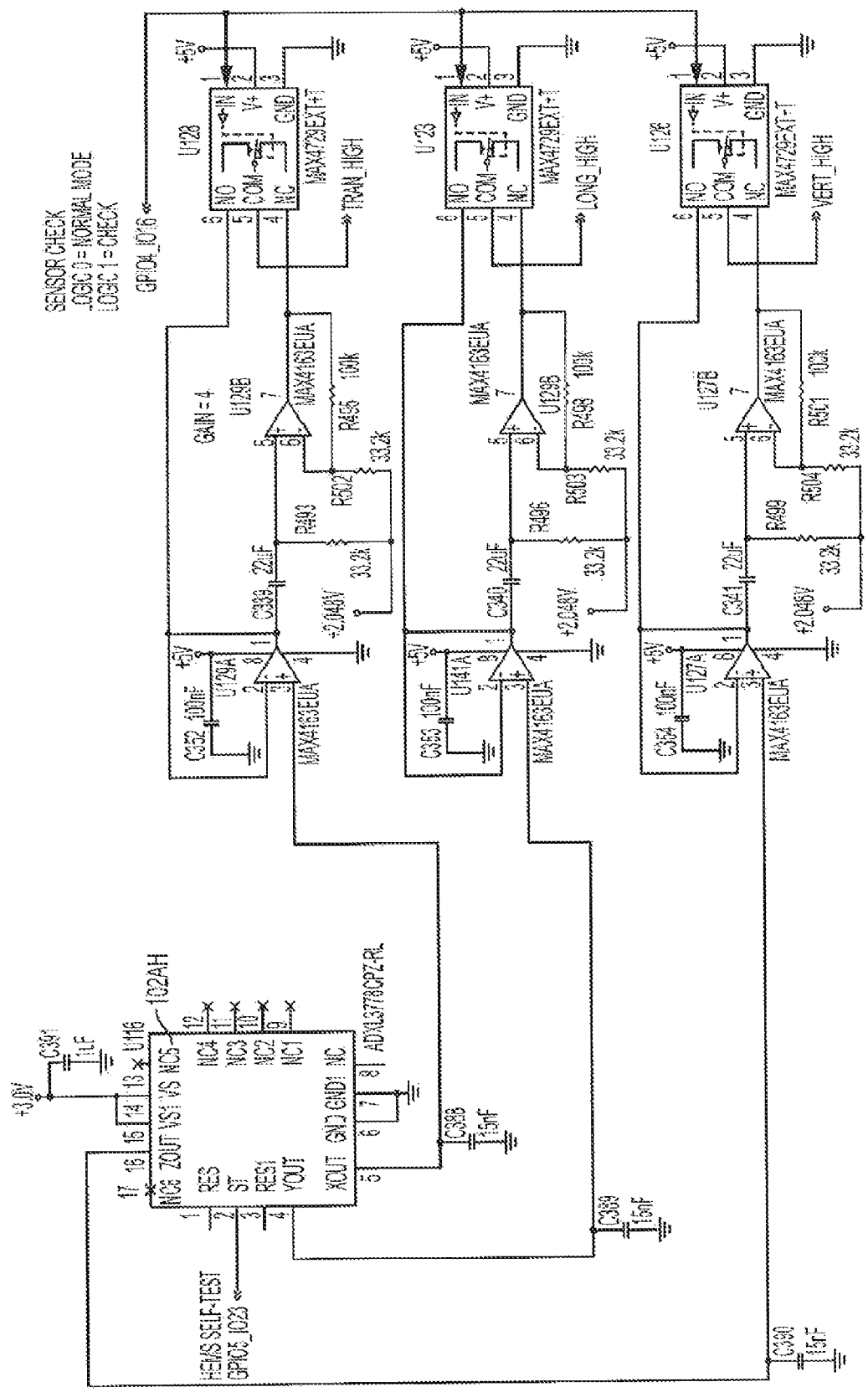
FIG. 4 is a schematic diagram of a high range accelerometer circuit.

The components shown in FIGS. 3-5 have the following values:

| | |
|---|---:|
| C10 | 1 nF |
| C11 | 100 nF |
| C12 | 2.2 µF |
| C13 | 2.2 µF |
| C14 | 100 nF |
| C15 | 100 nF |
| C16 | 10 µF |
| C120 | 100 nF |
| C336 | 22 µF |
| C337 | 22 µF |
| C338 | 22 µF |
| C339 | 22 µF |
| C340 | 22 µF |
| C341 | 22 µF |
| C352 | 100 nF |
| C353 | 100 nF |
| C354 | 100 nF |
| C355 | 100 nF |
| C356 | 100 nF |
| C357 | 100 nF |
| C385 | 15 nF |
| C386 | 15 nF |
| C387 | 15 nF |
| C391 | 1 µF |
| C392 | 1 µF |
| R88 | 47.5 kΩ |
| R483 | 1 MΩ |
| R485 | 33.2 kΩ |
| R486 | 100 kΩ |
| R487 | 33.2 kΩ |
| R489 | 100 kΩ |
| R490 | 33.2 kΩ |
| R492 | 100 kΩ |
| R493 | 33.2 kΩ |
| R495 | 100 kΩ |
| R496 | 33.2 kΩ |
| R499 | 33.2 kΩ |
| R501 | 100 kΩ |
| R502 | 33.2 kΩ |
| R503 | 33.2 kΩ |
| R504 | 33.2 kΩ |
| R505 | 33.2 kΩ |
| R506 | 33.2 kΩ |
| R507 | 33.2 kΩ |
| R593 | 0 Ohm |
| R594 | 249 kΩ |
| R595 | 249 kΩ |
| U12 | LTC1867AIGN |
| U32A-U32B | MAX4163EUA |
| U49A-U49B | SN74LVC2G00DCUR |
| U61 | MAX4729EXT + T |
| U116 | ADXL377BCPZ-RL |
| U117 | ADXL327BCPZ |
| U118 | MAX4162EUK |
| U119 | MAX4729EXT + T |
| U120A-U120B | MAX4163EUA |
| U121 | MAX4729EXT + T |

-continued

| | |
|---|---|
| U122A-U122B | MAX4163EUA |
| U123 | MAX4729EXT + T |
| U126 | MAX4729EXT + T |
| U127A-U127B | MAX4163EUA |
| U128 | MAX4729EXT + T |
| U129A-U129B | MAX4163EUA |
| U141A-U141B | MAX4163EUA |

A battery 102B may be provided for powering low range accelerometer 102AL, high range accelerometer 102AH, analog-to-digital conversion circuit 102ADC and/or interface circuit 102I.

Persons skilled in the art will recognize that using accelerometers instead of traditional geophones can result in a smaller sensor 100, being at least 40% (and preferably 60%) smaller than a sensor using traditional geophones.

Another advantage of using accelerometers over traditional geophones is that accelerometers are less sensitive to misalignment with the x-, y- and z-axes. A person may be required to re-install the geophone in order to obtain better positional alignment due to the angular range and positional limitations inherent to geophones. On the other hand, an accelerometer-based sensor would not have to be dug out from the ground, re-disposed, re-buried, etc.

That is because any misalignment can be calibrated via software by applying a correction factor for each axis. In other words, if the initial output of the accelerometer is (3, 5, −2) respectively for the x-, y- and z-axes, the software can apply a correction factor (−3, −5, 2) to any future measurements, for example. Persons skilled in the art will recognize that geophones cannot always be corrected in such manner due to the angular range and positional limitations inherent to geophones.

In order to be analyzed, the output from analog-to-digital conversion circuit 102ADC is sent to the interface circuit 102I. Before such analysis is conducted, interface circuit 102I must select which accelerometer data to analyze. Persons skilled in the art shall recognize that interface circuit 102I has a microprocessor and a memory with a program for selecting the accelerometer data. Interface circuit 102I will then provide the accelerometer data for computer or server 105 to utilize in further calculations, etc. Persons skilled in the art will recognize that it is possible to provide the raw accelerometer data to computer 105 without requiring interface circuit 102I. In such case, a communication circuit (not shown) is preferably provided in sensor 102 in order to relay the data to computer 105.

Figure 6:
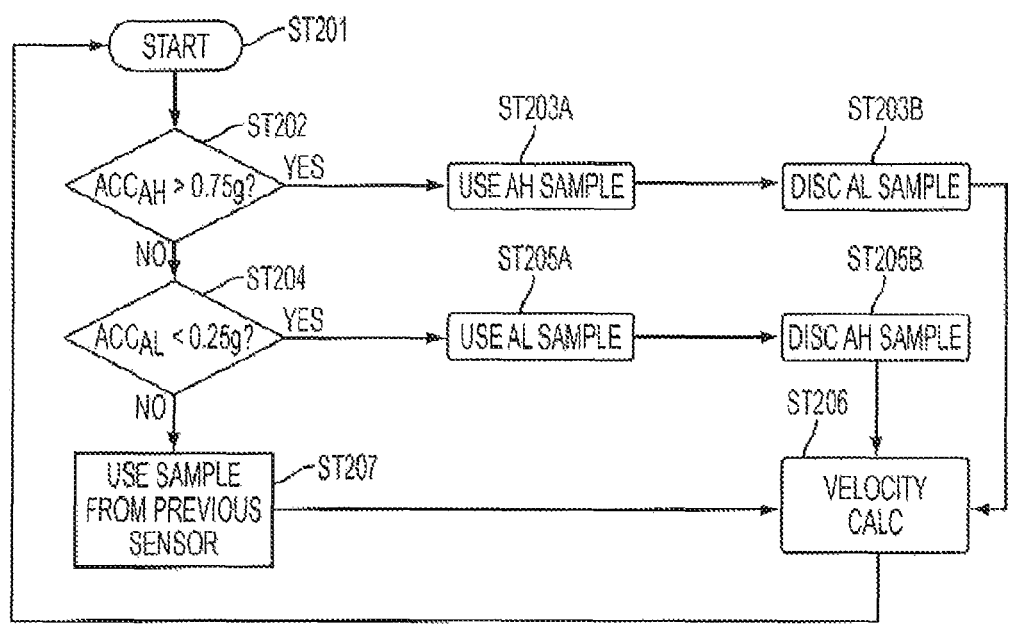
FIG. 6 is a flowchart for a data selection process.

FIG. 6 is a flowchart for such process. The process begins at the start (ST201), where the data stream is provided to interface circuit 102I (or computer 105).

Interface circuit 102I (or computer 105) examines the measured acceleration data from high range accelerometer 102AH. In particular, interface circuit 102I (or computer 105) checks whether the measured acceleration data from high range accelerometer 102AH is greater than a first threshold, e.g., 0.75 g (ST202). If so, the data from high range accelerometer 102AH is used (ST203A) to calculate velocity information (ST206) and the data from low range accelerometer 102AL is discarded (ST203B).

On the other hand, if the measured acceleration data from high range accelerometer 102AH is equal to or lower than the first threshold, then interface circuit 102I (or computer 105) examines the measured acceleration data from low range accelerometer 102AL. In particular, interface circuit 102I (or computer 105) checks whether the measured acceleration data from low range accelerometer 102AL is smaller than a second threshold, e.g., 0.25 g (ST204). If so, the data from low range accelerometer 102AL is used (ST205A) to calculate velocity information (ST206) and the data from high range accelerometer 102AH is discarded (ST205B).

On the other hand, if the measured acceleration data from low range accelerometer 102AL is equal to or higher than the second threshold, then interface circuit 102I (or computer 105) checks which accelerometer data was selected previously to use in the velocity calculation, and uses the current data from the previously selected accelerometer (ST207). For example, if the data from low range accelerometer 102AL was selected for use in the previous cycle, then interface circuit 102I (or computer 105) would select the current data from low range accelerometer 102AL for use in the velocity calculation. Persons skilled in the art will recognize that such algorithm provides hysteresis to the process and prevents the system from "bouncing" between the low and high range accelerometers 102AL, 102AH.

Persons skilled in the art will recognize that it is preferable to provide some mechanism to supplement step ST207 if the process has not gone through a previous cycle and thus has no data as to which accelerometer data was selected previously to use in the velocity calculation. Accordingly, interface circuit 102I (or computer 105) may be programmed to select the data from one of the accelerometers 102AL, 102AH. Persons skilled in the art may recognize that such programming may select one accelerometer, e.g., low range accelerometer 102AL, every time when there is no previous selected accelerometer.

Alternatively interface circuit 102I (or computer 105) may be programmed to select one accelerometer, e.g., low range accelerometer 102AL, the first time when there is no previous selected accelerometer, and then select the other accelerometer, e.g., high range accelerometer 102AHL, the next time when there is no previous selected accelerometer, thus alternating between accelerometers. One other possible arrangement would be where interface circuit 102I (or computer 105) randomly selects one accelerometer, e.g., low range accelerometer 102AL, the first time when there is no previous selected accelerometer.

The description of the invention is merely exemplary in nature and, thus, variations that do not depart from the gist of the invention are intended to be within the scope of the invention. Such variations are not to be regarded as a departure from the scope of the invention.

What is claimed is:

1. A vibration sensor system for construction and industrial projects, comprising:
   a water-proof housing;
   a low acceleration range accelerometer disposed in the housing for measuring acceleration data below a first threshold;
   a high acceleration range accelerometer disposed in the housing for measuring acceleration data above a second threshold; and
   an analog-to-digital conversion circuit connected to the low and high acceleration range accelerometers, wherein the analog-to-digital conversion circuit provides acceleration data along x-, y- and z-axes; and
   a data processing circuit receiving the acceleration data from the analog-to-digital conversion circuit, wherein the data processing circuit determines the directional orientation of the vibration sensor assembly, and determines a correction factor to be applied to the acceleration data to compensate for the directional orientation of the vibration sensor assembly.

2. The vibration sensor system of claim 1, wherein the low acceleration range accelerometer has a noise floor below 0.0248 g across frequencies up to 1 kHz.

3. The vibration sensor system of claim 1, wherein the low acceleration range accelerometer has a noise floor below 0.0248 g across frequencies between 1 Hz and 315 Hz.

4. The vibration sensor system of claim 1, wherein the high acceleration range accelerometer has a maximum acceleration equal to or greater than 50 g across frequencies up to 1 kHz.

5. The vibration sensor system of claim 1, wherein the high acceleration range accelerometer has a maximum acceleration equal to or greater than 50 g across frequencies between 1 Hz and 315 Hz.

6. The vibration sensor system of claim 1 further comprising a battery for powering at least one of the low acceleration range accelerometer, the high acceleration range accelerometer, and the analog-to-digital conversion circuit.

7. The vibration sensor system of claim 1, wherein the data processing system applies the correction factor to the acceleration data for correcting any misalignment between a desired directional orientation of the vibration sensor assembly and the actual directional orientation of the vibration sensor assembly.

8. A vibration sensor system for construction and industrial projects, comprising:
- a water-proof housing;
- a low acceleration range accelerometer disposed in the housing for measuring acceleration data below a first threshold;
- a high acceleration range accelerometer disposed in the housing for measuring acceleration data above a second threshold;
- an analog-to-digital conversion circuit connected to the low and high acceleration range accelerometers, wherein the analog-to-digital conversion circuit provides acceleration data along x-, y- and z-axes, and
- a data processing circuit receiving the acceleration data from the analog-to-digital conversion circuit, wherein the data processing circuit uses the acceleration data originating from the low acceleration range accelerometer to calculate velocity.

9. The vibration sensor system of claim 8, wherein the data processing circuit determines whether the acceleration data originating from the high acceleration range accelerometer is larger than a predetermined third threshold.

10. The vibration sensor system of claim 9, wherein, when the acceleration data originating from the high acceleration range accelerometer is larger than the predetermined third threshold, the data processing circuit uses the acceleration data originating from high acceleration range accelerometer to calculate velocity.

11. The vibration sensor system of claim 8, wherein the low acceleration range accelerometer has a noise floor below 0.0248 g across frequencies up to 1 kHz.

12. The vibration sensor system of claim 8, wherein the low acceleration range accelerometer has a noise floor below 0.0248 g across frequencies between 1 Hz and 315 Hz.

13. The vibration sensor system of claim 8 wherein the high acceleration range accelerometer has a maximum acceleration equal to or greater than 50 g across frequencies up to 1 kHz.

14. The vibration sensor system of claim 8, wherein the high acceleration range accelerometer has a maximum acceleration equal to or greater than 50 g across frequencies between 1 Hz and 315 Hz.

15. The vibration sensor system of claim 8 further comprising a battery for powering at least one of the low acceleration range accelerometer, the high acceleration range accelerometer, and the analog-to-digital conversion circuit.

16. The vibration sensor system of claim 8, wherein the data processing circuit determines the directional orientation of the vibration sensor assembly, and determines a correction factor to be applied to the acceleration data to compensate for the directional orientation of the vibration sensor assembly.

17. The vibration sensor system of claim 16, wherein the data processing system applies the correction factor to the acceleration data for correcting any misalignment between a desired directional orientation of the vibration sensor assembly and the actual directional orientation of the vibration sensor assembly.

* * * * *